(12) United States Patent
Wenning et al.

(10) Patent No.: US 7,645,003 B2
(45) Date of Patent: Jan. 12, 2010

(54) THERMALLY INSULATING WALL

(75) Inventors: Udo Wenning, Giengen/Brenz (DE);
Hans-Frieder Eberhardt,
Giengen-Burgberg (DE); Michael Neumann, Giengen/Brenz (DE);
Thomas Zeiler, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 420 days.

(21) Appl. No.: 09/969,190

(22) Filed: Oct. 1, 2001

(65) Prior Publication Data

US 2002/0074916 A1 Jun. 20, 2002

Related U.S. Application Data

(63) Continuation of application No. PCT/EP00/02836, filed on Mar. 30, 2000.

(30) Foreign Application Priority Data

Apr. 1, 1999 (DE) ............................... 199 15 456

(51) Int. Cl.
*A47B 96/04* (2006.01)
(52) U.S. Cl. .................................................. 312/401
(58) Field of Classification Search ................. 312/400, 312/401, 406, 402, 407; 52/309.8, 309.9; 428/317.7, 319.3
See application file for complete search history.

(56) References Cited

U.S. PATENT DOCUMENTS

| | | | | |
|---|---|---|---|---|
| 2,728,958 A | * | 1/1956 | King ........................... | 312/405 |
| 2,779,066 A | * | 1/1957 | Gaugler et al. ............... | 312/406 |
| 4,005,919 A | * | 2/1977 | Hoge et al. ............. | 156/244.27 |
| 4,122,203 A | * | 10/1978 | Stahl ........................ | 428/318.4 |
| 4,172,915 A | * | 10/1979 | Sheptak et al. ................ | 428/69 |
| 4,284,674 A | * | 8/1981 | Sheptak ........................ | 428/69 |
| 4,403,010 A | * | 9/1983 | Festag et al. ................. | 428/200 |
| 4,669,632 A | * | 6/1987 | Kawasaki et al. ........... | 428/172 |
| 4,688,551 A | | 8/1987 | Nakajima | |
| 5,076,984 A | * | 12/1991 | Bisplinghoff et al. ....... | 264/102 |
| 5,128,196 A | * | 7/1992 | Luetkens et al. ............ | 428/213 |
| 5,512,345 A | * | 4/1996 | Tsutsumi et al. .............. | 428/69 |

(Continued)

FOREIGN PATENT DOCUMENTS

DE 195 20 020 A1 12/1996

(Continued)

*Primary Examiner*—Janet M Wilkens
(74) *Attorney, Agent, or Firm*—James E. Howard; Andre Pallaples

(57) ABSTRACT

A refrigeration appliance includes a thermally insulating housing and a thermally insulating door. At least one of the housing and the door define an evacuated interspace and have an evacuated thermal insulation filling the interspace, a shaped, thermoplastic, substantially gas and water vapor impermeable outer cladding, and a shaped, thermoplastic, substantially gas and water vapor impermeable inner cladding. The inner cladding and the outer cladding substantially surround the interspace in a vacuum-tight manner. The cladding can be formed from polyolefins, polyvinylidene chloride, perfluoroalkoxy polymers. For reducing gas permeability, the cladding can be formed from ethylene/vinyl alcohol copolymer, polyacrylonitrile, and polyamide. The claddings can have co-extruded and/or laminated layers. The cladding can include a sputtered metal layer and/or a plastic/metal composite foil. The cladding can be formed from a thermoformed or blow-molded plastic. The insulation can have pressed silica or aerogel plates with a density of between 100 and 150 kg/m³.

17 Claims, 1 Drawing Sheet

U.S. PATENT DOCUMENTS

| | | | | |
|---|---|---|---|---|
| 5,722,482 A | * | 3/1998 | Buckley | 165/10 |
| 5,875,599 A | * | 3/1999 | McGrath et al. | 52/586.2 |
| 6,093,481 A | * | 7/2000 | Lynn et al. | 428/217 |
| 6,164,739 A | * | 12/2000 | Schulz et al. | 312/406 |
| 6,168,040 B1 | * | 1/2001 | Sautner et al. | 220/592.1 |
| 2002/0114937 A1 | * | 8/2002 | Albert et al. | 428/304.4 |
| 2003/0090188 A1 | * | 5/2003 | Gamberoni et al. | 312/406 |

FOREIGN PATENT DOCUMENTS

| | | | |
|---|---|---|---|
| DE | 196 48 305 A1 | | 5/1998 |
| DE | 298 16 013 U1 | | 2/1999 |
| DE | 19840640 | * | 3/2000 |
| EP | 0 860 669 A1 | | 8/1998 |
| FR | 2 755 159 A1 | | 4/1998 |
| WO | WO 98/29309 | | 7/1998 |

* cited by examiner

THERMALLY INSULATING WALL

CROSS-REFERENCE TO RELATED APPLICATION

This application is a continuation of International Application No. PCT/EP00/02836, filed Mar. 30, 2000, which designated the United States.

BACKGROUND OF THE INVENTION

Field of the Invention

The invention lies in the field of vacuum-insulated walls. The invention relates to a thermally insulating wall with an evacuated interspace that is filled with thermally insulating material that can be evacuated and that is at least as far as possible surrounded, in an at least approximately vacuum-tight manner, by an outer cladding and an inner cladding.

In the field of vacuum-insulated walls, such as housings and doors for chilling appliances, to achieve a service life of the order of magnitude of 15 years for the housings and doors that are based on the vacuum insulation technique, the prior art uses surrounding walls that are formed from stainless steel to construct these appliances. Although such surrounding walls have the leakage or permeation rates that are appropriate for the required service life, they are relatively complex and, therefore, expensive, in manufacturing terms, to shape and to join for use. With regard to the structure of the thermally insulating walls, thermal conduction should at least as far as possible be eliminated from the inner surrounding wall, which delimits a chamber that is at a defined temperature level, to the outer surrounding wall, which is exposed to room temperature. In the past, diaphragm-like connecting elements that are sensitive to impacts have been used. Furthermore, the surrounding walls, formed from thin-walled stainless steel, require the use of a joining technique that uses a reliable process and has long-term stability. Such a joining technique has been regarded as requiring a laser weld for the existing thermally insulating walls that are formed into housings and doors for refrigeration appliances. However, such a joining technique involves relatively high investment costs for manufacture.

SUMMARY OF THE INVENTION

It is accordingly an object of the invention to provide a thermally insulating wall that overcomes the hereinafore-mentioned disadvantages of the heretofore-known devices of this general type and that avoids the drawbacks of the prior art by simple measures.

With the foregoing and other objects in view, there is provided, in accordance with the invention, a refrigeration appliance including a thermally insulating housing, a thermally insulating door. At least one of the housing and the door defining an evacuated interspace and having an evacuated thermal insulation filling the interspace, a shaped, thermoplastic, substantially gas and water vapor impermeable outer cladding, a shaped, thermoplastic, substantially gas and water vapor impermeable inner cladding, and the inner cladding and the outer cladding substantially surrounding the interspace in a substantially vacuum-tight manner.

According to the invention, such avoidance is achieved by the fact that the inner and/or the outer cladding is formed from thermoplastic that is provided with a device or means for at least as far as possible reducing its water vapor and gas permeability.

The use of plastic for one or both of the claddings makes it easy to bypass the problem of eliminating thermal conduction along the temperature gradient between the inner cladding and the outer cladding, due to the low thermal conductivity of plastic. As a result, there is no need to join the two cladding units with a diaphragm-like connecting element, which can only be produced with difficulty, and by fitting the diaphragm-like connecting element to the inner cladding and the outer cladding, such fitting being complex in terms of production engineering. Furthermore, by way of example, an inner cladding that is made from plastic additionally has a benefit that the inner cladding and the functional elements provided thereon, such as supports for intermediate shelves, features for collecting and discharging condensation water, can be integrally formed at a low cost by chip less shaping. Moreover, cladding parts made from plastic allow various integrally formed parts, such as a compressor recess or the like, to be produced at low cost. At the same time, the use of plastic materials results in a considerable reduction in weight for a refrigeration appliance housing as compared to a metal housing.

The permeability reducing device is disposed particularly securely and permanently on the inner and/or outer cladding if, in accordance with a further feature of the invention, the device is disposed on the inner cladding and/or the outer cladding by co-extrusion.

In accordance with an added feature of the invention, the permeability-reducing device is disposed on the inner cladding and/or the outer cladding by lamination.

As a result, it is possible to produce a permanent material-to-material bond between the thermoplastic and a material that is optimized with a view to achieving minimum water vapor and gas permeability.

With a view to significantly reducing the water vapor permeability on the inner and/or outer cladding, the permeability reducing device is particularly effective if, in accordance with an additional feature of the invention, the device for at least as far as possible reducing the water vapor permeability of the inner cladding and/or of the outer cladding are formed by polyolefins or by other materials, such as polyvinylidene chloride or perfluoroalkoxy polymers.

A device for reducing the gas permeability of the inner and/or outer cladding has proven particularly advantageous if, in accordance with yet another feature of the invention, the device for at least as far as possible reducing the gas permeability of the inner and/or outer cladding are formed, for example, by ethylene/vinyl alcohol copolymer or polyacrylonitrile or polyamide.

Permeability to water vapor and gas is avoided particularly reliably if, in accordance with yet a further feature of the invention, the device is formed by a metal layer that is produced by sputtering on the inner and/or outer cladding.

Particularly effective deformability for the inner and outer cladding results if, in accordance with yet an added feature of the invention, the device is formed from a plastic/metal composite foil.

The inner cladding and the outer cladding can be produced at particularly low cost with different shapes if, in accordance with yet an additional feature of the invention, the inner and/or outer cladding is/are formed from thermoformable or blow-moldable plastic.

Particularly flat wall surfaces for the thermally insulating wall that is configured as a housing or door for a refrigeration appliance are achieved if, in accordance with again another feature of the invention, the thermally insulating material is formed from plate-like bodies.

The plate-like bodies are particularly effective, with a view to maintaining the vacuum required for thermal insulation, if, in accordance with again a further feature of the invention, the plate-like bodies are produced by pressing silica or aerogels. Use of such materials, which already have a very low thermal conductivity in a pressure range of the order of magnitude of 1 mbar to 100 mbar, allows inexpensive large-scale series production of refrigeration appliance housings and refrigeration appliance doors with an inner and outer cladding formed from plastic.

In accordance with again an added feature of the invention, at least one of the inner cladding and the outer cladding has a material thickness of between 0.5 mm and 2.5 mm.

Plate-like bodies made from silica in conjunction with inner and outer claddings formed from plastic have proven particularly expedient with regard to achieving and maintaining a long-term quality of insulation if, in accordance with again an additional feature of the invention, the plate-like bodies made from silica have a density of between 100 kg/m3 and 200 kg/m3.

Plate-like bodies made from aerogels in combination with an inner and outer cladding made from plastic for the production of thermally insulating walls have also proven particularly suitable to achieve and maintain a long-term, high quality of insulation if, in accordance with still another feature of the invention, the plate-like bodies made from aerogels have a density of between 100 kg/m3 and 150 kg/m3.

Thermally insulating walls that are provided with an inner and outer cladding made from plastic can be produced with a particularly low weight and at low cost if, in accordance with still a further feature of the invention, the plate-like bodies are made of an open-cell, foamed thermal insulation material. In such a context, open-cell polyurethane foams or open-cell polystyrene foams have proven expedient.

With the objects of the invention in view, there is also provided a housing for a refrigeration appliance including a shaped, thermoplastic, substantially gas and water vapor impermeable outer cladding, a shaped, thermoplastic, substantially gas and water vapor impermeable inner cladding, the inner cladding and the outer cladding forming a substantially vacuum-tight manner interspace therebetween, and an evacuated thermal insulation filling the interspace.

With the objects of the invention in view, there is also provided a door for a refrigeration appliance, including a shaped, thermoplastic, substantially gas and water vapor impermeable outer cladding, a shaped, thermoplastic, substantially gas and water vapor impermeable inner cladding, the inner cladding and the outer cladding forming a substantially vacuum-tight manner interspace therebetween, and an evacuated thermal insulation filling the interspace.

Refrigeration appliances with such refrigeration appliance housings and doors, with conventional external dimensions, for example, in the form of predetermined dimensions for an appliance recess in a fitted kitchen, compared to conventional refrigeration appliances, have an increased capacity for storing refrigerated or frozen products because an improved quality of insulation with an insulation thickness that is considerably reduced compared to that of conventional refrigeration appliances is achieved. Moreover, the high insulation quality significantly reduces the energy consumption of the refrigeration appliances that are based on these thermally insulating walls.

Other features that are considered as characteristic for the invention are set forth in the appended claims.

Although the invention is illustrated and described herein as embodied in a thermally insulating wall, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
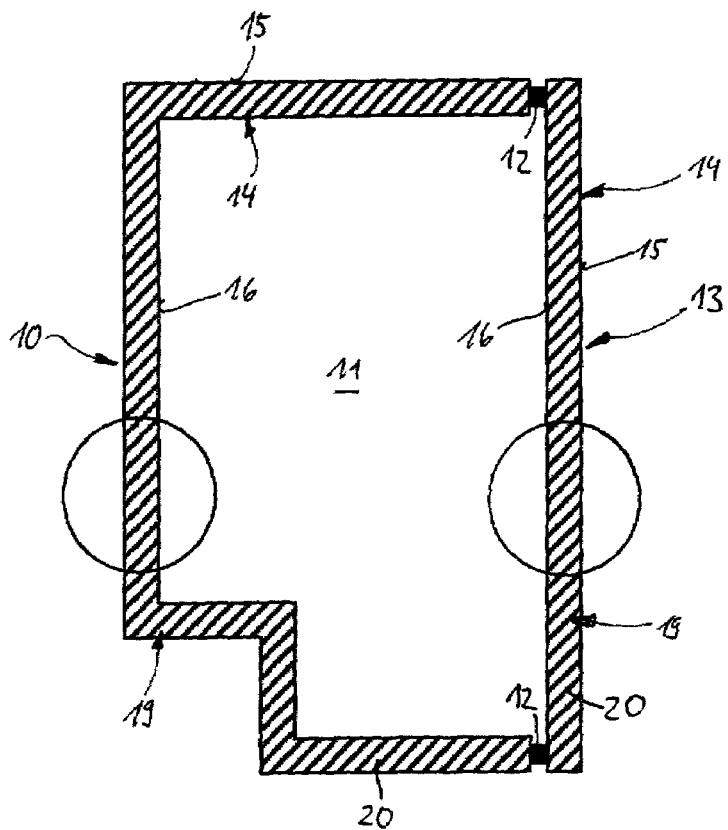
FIG. 1 is a cross-sectional diagrammatic view of a refrigeration appliance housing with a door in the closed position.

Referring now to the figures of the drawings in detail and first, particularly to FIG. 1 thereof, there is shown a simplified diagrammatic illustration of a thermally insulating housing 10 using vacuum insulation that is suitable for use in a refrigeration appliance. The housing 10 accommodates a useful space 11 that is configured as a refrigeration space and, to close off the useful space 11, is fitted with a door 13 that bears elastically against its open edge through a magnetic seal 12. The door 13, configured using vacuum thermal insulation in the same way as the housing 10, has, like the housing 10, a layered wall structure 14. The layered wall structure 14 includes, both for the housing 10 and for the door 13, an outer cladding 15 that is formed as a single piece from thermoplastic without material-removing machining and, when used for the door 13, is used to attach a non-illustrated door handle. When the outer cladding 15 is used for the housing 10, it forms the outer shell of the latter.

At a distance from the outer cladding 15, the layer-like wall structure 14 has an inner cladding 16, which is likewise formed in a single piece from thermoplastic without material-removing machining and surrounds the useful space 11 in the case of the housing 10 or faces the useful space 11 when used for the door.

Figure 2:
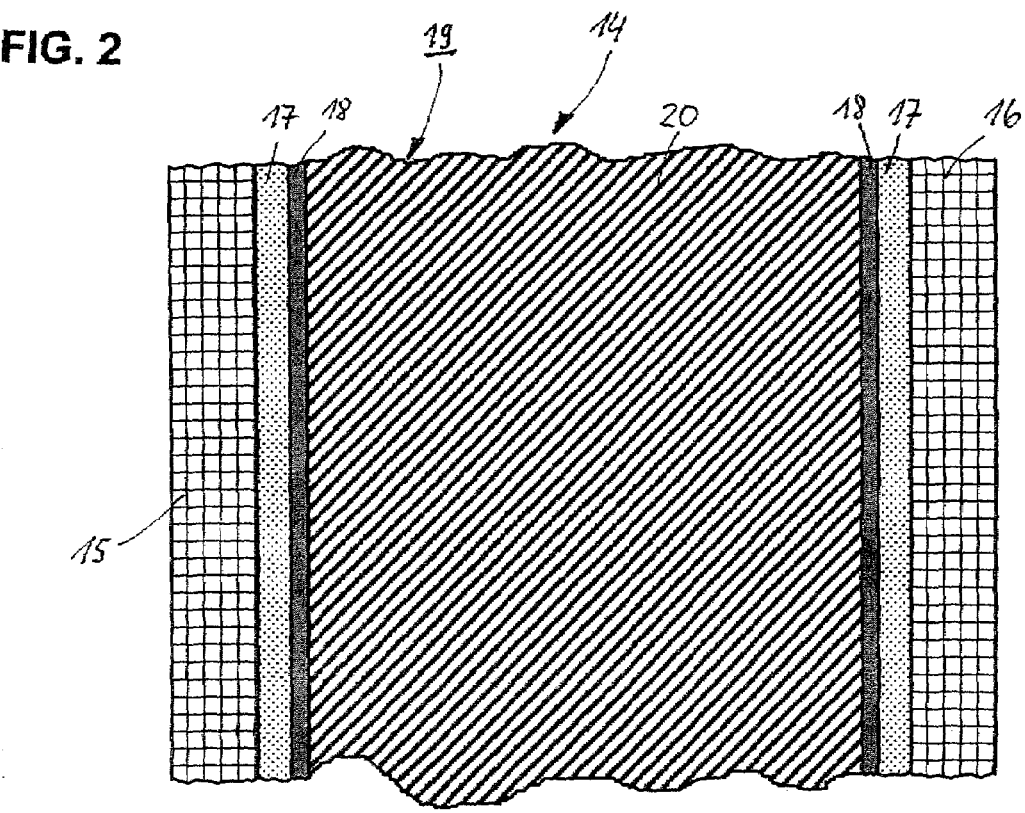
FIG. 2 is an enlarged, fragmentary, cross-sectional view of the refrigeration appliance housing of FIG. 1.

As can be seen in particular from FIG. 2, the inner cladding 16 and the outer cladding 15, in the present exemplary embodiment, are provided, on their mutually facing inner sides, with a layer 17 that considerably reduces or even prevents water vapor permeability. The layer 17 is applied by co-extrusion or lamination and is based on polyolefins, such as, for example, high-density polyethylene, polypropylene, or other materials, such as polyvinylidene chloride or perfluoroalkoxy polymers. In turn, a layer 18 that at least considerably reduces or even prevents gas permeability, for example, a layer of ethylene/vinyl alcohol copolymer or polyacrylonitrile or polyamide is applied to the layer 17 by co-extrusion or lamination. It is also possible for the water vapor and gas permeability of a sputtered aluminum layer to be reduced considerably. For example, a layer that prevents gas permeability, including ethylene/vinyl alcohol copolymer with a layer thickness of approx. 470 μm, and a layer that serves as a barrier to water vapor, made of perfluoroalkoxy polymers with a layer thickness of 30 to 35 μm, in combination with an outer cladding 15 and an inner cladding 16 made from impact-resistant polystyrene with a material thickness of 0.8 to 2.0 mm are suitable to construct the housing and door. The outer cladding 15 and inner cladding 16 provided with the layers 17 and 18 are joined to one another at their free ends in a vacuum-tight manner, for example, by welding, adhesive bonding, or the like, and, together, enclose an interspace 19 that can be evacuated. The interspace 19 is filled with plate-like thermal insulation material 20, for example, made from silica that has been pressed into plate-like shaped bodies and has a density of between 100 kg/m3 and 200 kg/m3 or aerogels with a density of between 100 kg/m3 and 150 kg/m3. Thermal insulation materials, such as open-cell polyurethane foams or open-cell polystyrene foams, are also suitable for such a purpose.

As an alternative to the exemplary embodiment described above, it is also possible for either the inner cladding 15 or the outer cladding 16 to be made from stainless steel or other materials that are suitable for vacuum insulation and for the cladding then to be combined with an outer cladding 15 or an inner cladding 16 made from plastic.

In particular, for the production of the outer cladding 15 and of the inner cladding 16 for use on the door 13, it is also possible for the shaped body made of the outer cladding 15 and the inner cladding 16 with the associated layers 17 and 18 to be produced by plastic blow-molding.

We claim:

1. A door for a refrigeration appliance comprising:
   a rigid, shaped, thermoplastic, substantially gas and water impermeable outer cladding making up a part of a wall of a door;
   a rigid, shaped, thermoplastic, substantially gas and water impermeable inner cladding making up a part of a wall of a door;
   said outer cladding and inner cladding joined together in a substantial vacuum tight manner to form said door with an interspace defined between said joined outer cladding and inner cladding and being evacuated; and
   evacuable thermal insulation material filling said interspace.

2. The door according to claim 1, further comprising a layer adhered on a side of the outer cladding and the inner cladding facing said interspace and resisting water vapor permeability and gas permeability through the door.

3. The door according to claim 2, wherein said layer is formed from at least one of the group consisting of polyolefins, polyvinylidene chloride, perfluoroalkoxy polymers, ethylene/vinyl alcohol copolymer, polyacrylonitrile and polyamide.

4. The door according to claim 2, wherein said layer is formed from a plastic/metal composite foil.

5. The door according to claim 1, wherein said inner cladding and said outer cladding have a thickness of about 0.5 mm to about 2.5 mm.

6. A refrigeration appliance, comprising:
   a housing having five walls defining a refrigeration space, and an opening into the refrigeration space;
   a door fitted on said housing at the opening into the refrigeration space for closing off the refrigeration space;
   said walls of said housing and said door each comprising a rigid, shaped, thermoplastic, substantially gas and water impermeable outer cladding, a rigid, shaped, thermoplastic, substantially water impermeable inner cladding, said inner cladding and outer cladding for each wall and for the door joined together in a substantial vacuum tight manner to form each one of the walls and the door, with an interspace defined between said inner cladding and said outer cladding and being evacuated for each one of said walls and said door, and evacuable thermal insulation materials filling the respective interspaces.

7. The refrigeration appliance according to claim 6, further comprising a layer adhered on a side of the outer cladding and the inner cladding facing said interspace and resisting water vapor permeability and gas permeability through the walls and door.

8. The refrigeration appliance according to claim 7, wherein said layer is formed from at least one of the group consisting of polyolefins, polyvinylidene chloride, perfluoroalkoxy polymers, ethylene/vinyl alcohol copolymer, polyacrylonitrile and polyamide.

9. The refrigeration appliance according to claim 7, wherein said layer is formed from a plastic/metal composite foil.

10. The refrigeration appliance according to claim 6, wherein said inner cladding and said outer cladding have a thickness of about 0.5 mm to about 2.5 mm.

11. A refrigeration appliance, comprising:
    a housing having multiple walls defining an internal useful space, and an opening into the useful space;
    a door fitted on said housing at the opening into the useful space for closing off the useful space;
    said walls of said housing and said door each comprising:
        a rigid outer cladding having an outer cladding internal surface facing inwardly toward the useful space and an outer cladding external surface facing outwardly away from the useful space and at least partially forming an external outer shell of the housing exposed to ambient air;
        a rigid inner cladding having an inner cladding internal surface facing outwardly away from the useful space and an inner cladding external surface facing inwardly toward the useful space and being exposed to the useful space;
        a first layer being substantially water impermeable and covering the outer cladding internal surface and the inner cladding internal surface;
        a second layer being substantially gas impermeable and covering the outer cladding internal surface and the inner cladding internal surface;
        an interspace defined between the inner and outer claddings and being evacuated to provide a vacuum insulated region; and
        a thermal insulation material disposed within the interspace.

12. The refrigeration appliance according to claim 11, wherein the inner and outer claddings are formed from a thermoplastic material.

13. The refrigeration appliance according to claim 11, wherein the inner and outer claddings are formed from a metal material.

14. The refrigeration appliance according to claim 11, wherein the first layer is formed from a material including at least one polyolefins, high-density polyethylene, polypropylene, polyvinylidene chloride, and perfluoroalkoxy polymers.

15. The refrigeration appliance according to claim 11, wherein the second layer is formed from a material including at least one of ethylene/vinyl alcohol copolymer, polyacrylonitrile, and polyamide.

16. The refrigeration appliance according to claim 11, wherein each first layer is disposed between the respective second layer and corresponding one of the outer and inner claddings.

17. The refrigeration appliance according to claim 11, wherein the first layers are bonded to the inner and outer claddings and the second layers are bonded over the first layer.

* * * * *